US011266561B2

(12) United States Patent
Lamb et al.

(10) Patent No.: US 11,266,561 B2
(45) Date of Patent: *Mar. 8, 2022

(54) EXOSKELETON FIT EVALUATION SYSTEM AND METHOD

(71) Applicant: Roam Robotics Inc., San Francisco, CA (US)

(72) Inventors: Callum Lamb, San Bruno, CA (US); Kevin Kemper, San Francisco, CA (US); Tim Swift, Walnut Creek, CA (US)

(73) Assignee: ROAM ROBOTICS INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,768

(22) Filed: Aug. 19, 2020

(65) Prior Publication Data

US 2020/0375836 A1    Dec. 3, 2020

Related U.S. Application Data

(63) Continuation of application No. 16/116,298, filed on Aug. 29, 2018, now Pat. No. 10,780,012.

(Continued)

(51) Int. Cl.
*A61H 3/00*    (2006.01)
*B25J 9/00*    (2006.01)
*A61H 1/02*    (2006.01)

(52) U.S. Cl.
CPC .............. *A61H 3/00* (2013.01); *A61H 1/024* (2013.01); *A61H 1/0266* (2013.01);

(Continued)

(58) Field of Classification Search
CPC ........ A61H 3/00; A61H 1/0266; A61H 1/024; A61H 2201/1642; A61H 2203/0406;

(Continued)

(56) References Cited

U.S. PATENT DOCUMENTS 440,684 A    11/1890   Yagn
3,823,711 A    7/1974   Hatton (Continued)

FOREIGN PATENT DOCUMENTS

CN    105205436 A    12/2015
CN    105590409 A    5/2016

(Continued)

OTHER PUBLICATIONS

Huang et al., "Interactive learning for sensitivity factors of a human-powered augmentation lower exoskeleton," 2015 IEEE/RSJ International Conference on Intelligent Robots and Systems (IROS), Sep. 28, 2015, 7 pages.

(Continued)

*Primary Examiner* — Benjamin R Schmitt
(74) *Attorney, Agent, or Firm* — Davis Wright Tremaine LLP

(57) ABSTRACT

A method of performing a fit test on an actuator unit coupled to a user. The method includes actuating the actuator unit; determining a first configuration of the actuator unit generated during the actuating the actuator unit; determining a second configuration of the actuator unit generated during the actuating the actuator unit; determining a change in configuration of the actuator unit based at least in part on the difference between the first and second configuration; and determining that the change in configuration corresponds to an improper fit of the actuator unit to the user.

18 Claims, 9 Drawing Sheets

Related U.S. Application Data

(60) Provisional application No. 62/551,664, filed on Aug. 29, 2017.

(52) U.S. Cl.
CPC ..... *B25J 9/0006* (2013.01); *A61H 2201/1238* (2013.01); *A61H 2201/164* (2013.01); *A61H 2201/165* (2013.01); *A61H 2201/1642* (2013.01); *A61H 2201/1676* (2013.01); *A61H 2201/5007* (2013.01); *A61H 2201/5058* (2013.01); *A61H 2201/5061* (2013.01); *A61H 2201/5064* (2013.01); *A61H 2201/5069* (2013.01); *A61H 2201/5084* (2013.01); *A61H 2203/0406* (2013.01); *A61H 2205/10* (2013.01)

(58) Field of Classification Search
CPC ........ A61H 2205/10; A61H 2201/1238; A61H 2201/5058; A61H 2201/5084; A61H 2201/5061; A61H 2201/5064; A61H 2201/1676; A61H 2201/165; A61H 2201/164; A61H 2201/5007; A61H 2201/5069; B25J 9/0006; B25J 9/142; B25J 19/0095; G01M 99/005; G01M 99/008

See application file for complete search history.

(56) References Cited

U.S. PATENT DOCUMENTS

| | | |
|---|---|---|
| 3,868,952 A | 3/1975 | Hatton |
| 3,982,531 A | 9/1976 | Shaffer |
| 3,993,056 A | 11/1976 | Rabischong et al. |
| 4,274,399 A | 6/1981 | Mummert |
| 4,523,582 A | 6/1985 | Barber |
| 4,671,258 A | 6/1987 | Barthlome |
| 4,944,755 A | 7/1990 | Hennequin et al. |
| 5,033,457 A | 7/1991 | Bonutti |
| 5,483,838 A | 1/1996 | Holden |
| 7,086,322 B2 | 8/2006 | Schulz |
| 7,479,121 B2 | 1/2009 | Branch |
| 8,171,570 B2 | 5/2012 | Adarraga |
| 8,784,350 B2 | 7/2014 | Cohen |
| 9,205,560 B1 | 12/2015 | Edsinger et al. |
| 9,821,475 B1 | 11/2017 | Lynn et al. |
| 9,995,321 B2 | 6/2018 | Lynn et al. |
| 10,012,229 B2 | 7/2018 | Lynn et al. |
| 10,543,110 B2 | 1/2020 | Piercy et al. |
| 10,562,180 B2 | 2/2020 | Telleria et al. |
| 10,605,365 B1 | 3/2020 | Griffith et al. |
| 10,619,633 B2 | 4/2020 | Lynn et al. |
| 2001/0029343 A1 | 10/2001 | Seto et al. |
| 2002/0026794 A1 | 3/2002 | Shahinpoor et al. |
| 2006/0069336 A1 | 3/2006 | Krebs et al. |
| 2006/0161220 A1 | 7/2006 | Kobayashi et al. |
| 2006/0173552 A1 | 8/2006 | Roy |
| 2008/0009771 A1 | 1/2008 | Perry et al. |
| 2008/0161937 A1 | 7/2008 | Sankai |
| 2008/0195005 A1 | 8/2008 | Horst et al. |
| 2008/0234608 A1 | 9/2008 | Sankai |
| 2008/0287850 A1 | 11/2008 | Adarraga |
| 2010/0114329 A1 | 5/2010 | Casler et al. |
| 2010/0204627 A1 | 8/2010 | Kazerooni et al. |
| 2010/0249675 A1 | 9/2010 | Fujimoto et al. |
| 2010/0280424 A1 | 11/2010 | Kawakami et al. |
| 2011/0071417 A1 | 3/2011 | Liu et al. |
| 2011/0118635 A1 | 5/2011 | Vamamoto |
| 2012/0289870 A1 | 11/2012 | Hsiao-Wecksler et al. |
| 2013/0150980 A1 | 6/2013 | Swift et al. |
| 2013/0158445 A1 | 6/2013 | Kazerooni et al. |
| 2013/0245512 A1 | 9/2013 | Goffer et al. |
| 2013/0289452 A1 | 10/2013 | Smith et al. |
| 2014/0109560 A1 | 4/2014 | Tlievski et al. |
| 2014/0276264 A1 | 9/2014 | Caires et al. |
| 2014/0277739 A1 | 9/2014 | Kornbluh et al. |
| 2014/0318118 A1 | 10/2014 | Mazzeo et al. |
| 2015/0088043 A1 | 3/2015 | Goldfield et al. |
| 2015/0126911 A1 | 5/2015 | Abramowicz et al. |
| 2015/0173993 A1 | 6/2015 | Walsh et al. |
| 2015/0209214 A1 | 7/2015 | Herr et al. |
| 2015/0290794 A1 | 10/2015 | Griffith et al. |
| 2016/0107309 A1 | 4/2016 | Walsh et al. |
| 2016/0213548 A1* | 7/2016 | John ............ A61H 1/0277 |
| 2016/0261224 A1 | 9/2016 | Madrone et al. |
| 2016/0278948 A1 | 9/2016 | Piercy et al. |
| 2016/0297504 A1 | 10/2016 | Saindon et al. |
| 2016/0300156 A1 | 10/2016 | Bowers et al. |
| 2016/0331557 A1 | 11/2016 | Tong et al. |
| 2016/0331624 A1 | 11/2016 | Sankai et al. |
| 2017/0049587 A1 | 2/2017 | Herr et al. |
| 2017/0202725 A1 | 7/2017 | Robertson et al. |
| 2018/0079071 A1 | 3/2018 | Griffith et al. |
| 2018/0125152 A1 | 5/2018 | Bruel |
| 2018/0221237 A1 | 8/2018 | Swift et al. |
| 2018/0235830 A1 | 8/2018 | Rokosz et al. |
| 2018/0283414 A1 | 10/2018 | Lynn et al. |
| 2019/0015233 A1 | 1/2019 | Galloway et al. |
| 2019/0060156 A1 | 2/2019 | Swift et al. |
| 2019/0307583 A1 | 10/2019 | Herr et al. |
| 2020/0253808 A1 | 8/2020 | Swift et al. |

FOREIGN PATENT DOCUMENTS

| | | | |
|---|---|---|---|
| EP | 2827809 | A1 | 1/2015 |
| EP | 3173191 | A2 | 5/2017 |
| JP | 2000051289 | A | 2/2000 |
| JP | 2007282991 | A | 11/2007 |
| JP | 2012532001 | | 12/2012 |
| JP | 2016137146 | | 8/2016 |
| WO | 9722782 | A1 | 6/1997 |
| WO | 0004852 | A1 | 2/2000 |
| WO | 2009081710 | | 7/2009 |
| WO | 2015080596 | A1 | 6/2015 |
| WO | 2015104832 | A1 | 7/2015 |
| WO | 2016166442 | A1 | 10/2016 |
| WO | 2016166588 | A1 | 10/2016 |
| WO | 2016207855 | A1 | 12/2016 |
| WO | 2017110453 | A1 | 6/2017 |
| WO | 2019183397 | A1 | 9/2019 |
| WO | 2019187030 | A1 | 10/2019 |

OTHER PUBLICATIONS

International Search Report and Written Opinion dated Apr. 26, 2018, International Patent Application No. PCT/US2018/016729, filed Feb. 2, 2018, 7 pages.

International Search Report and Written Opinion dated Dec. 6, 2018, International Patent Application No. PCT/US2018/048638, filed Aug. 29, 2018, 8 pages.

International Search Report and Written Opinion dated Dec. 6, 2018, Patent Application No. PCT/US2018/048639, 7 pages.

International Search Report and Written Opinion dated Jul. 18, 2016, International Patent Application No. PCT/US2016/024366, filed Mar. 25, 2016, 7 pages.

International Search Report and Written Opinion dated Jul. 19, 2018, International Patent Application No. PCT/US2018/027643, filed Apr. 13, 2018, 7 pages.

International Search Report and Written Opinion dated Jun. 3, 2021, Patent Application No. PCT/US2021/019711, 12 pages.

International Search Report and Written Opinion dated Mar. 30, 2021, Patent Application No. PCT/US2020/064647, 10 pages.

Tamez-Duque et al., "Real-time strap pressure sensor system for powered exoskeletons," Sensors 15(2):4550-4563, Feb. 2015.

Taniguchi, "Flexible Artificial Muscle Actuator Using Coiled Shape 5 Memory Alloy Wires," APCBEE Procedia 7:54-59, Jan. 1, 2013.

* cited by examiner

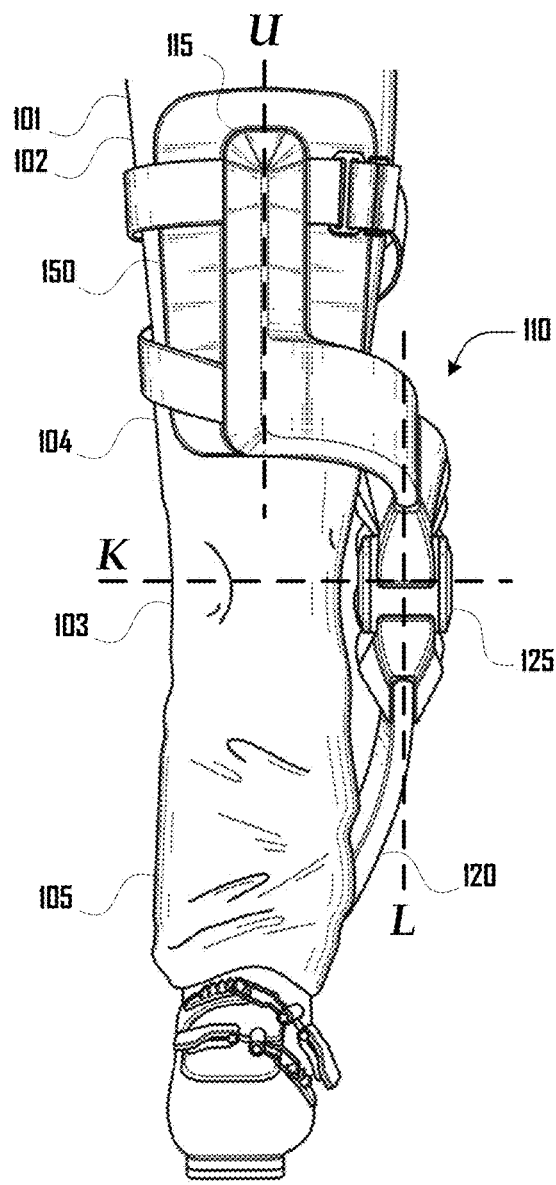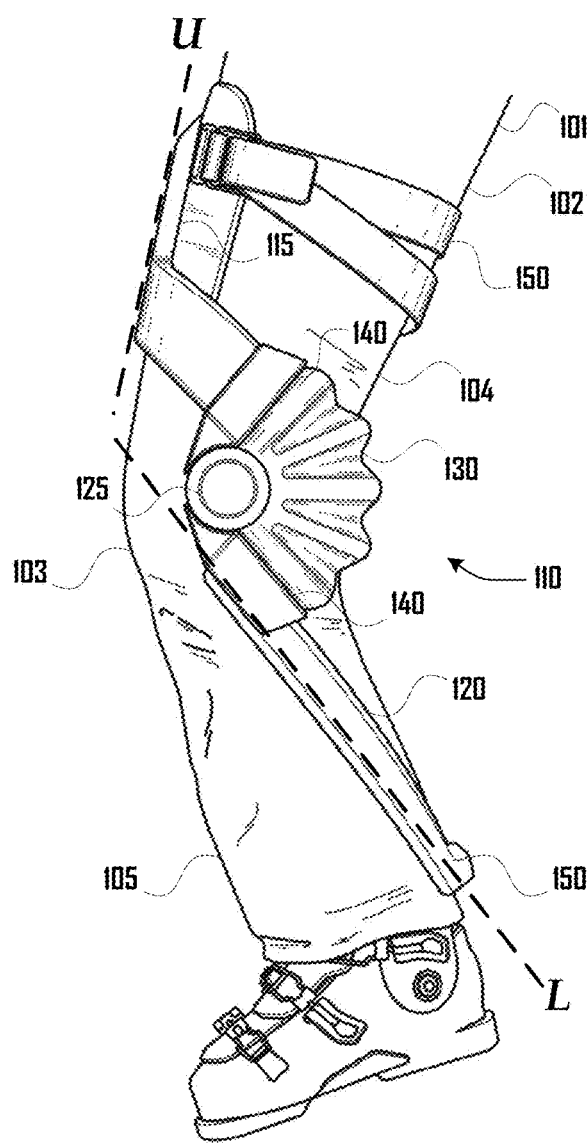

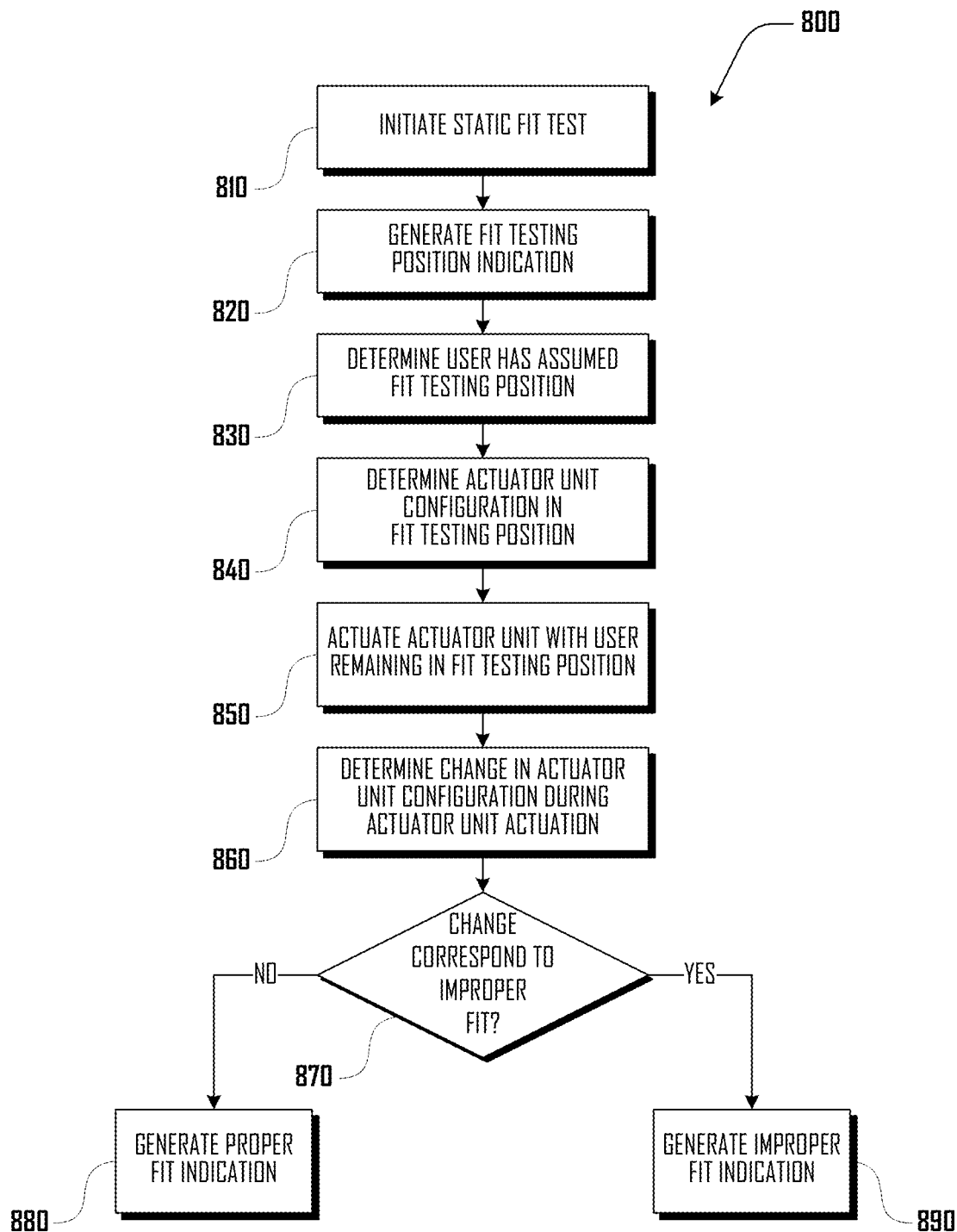

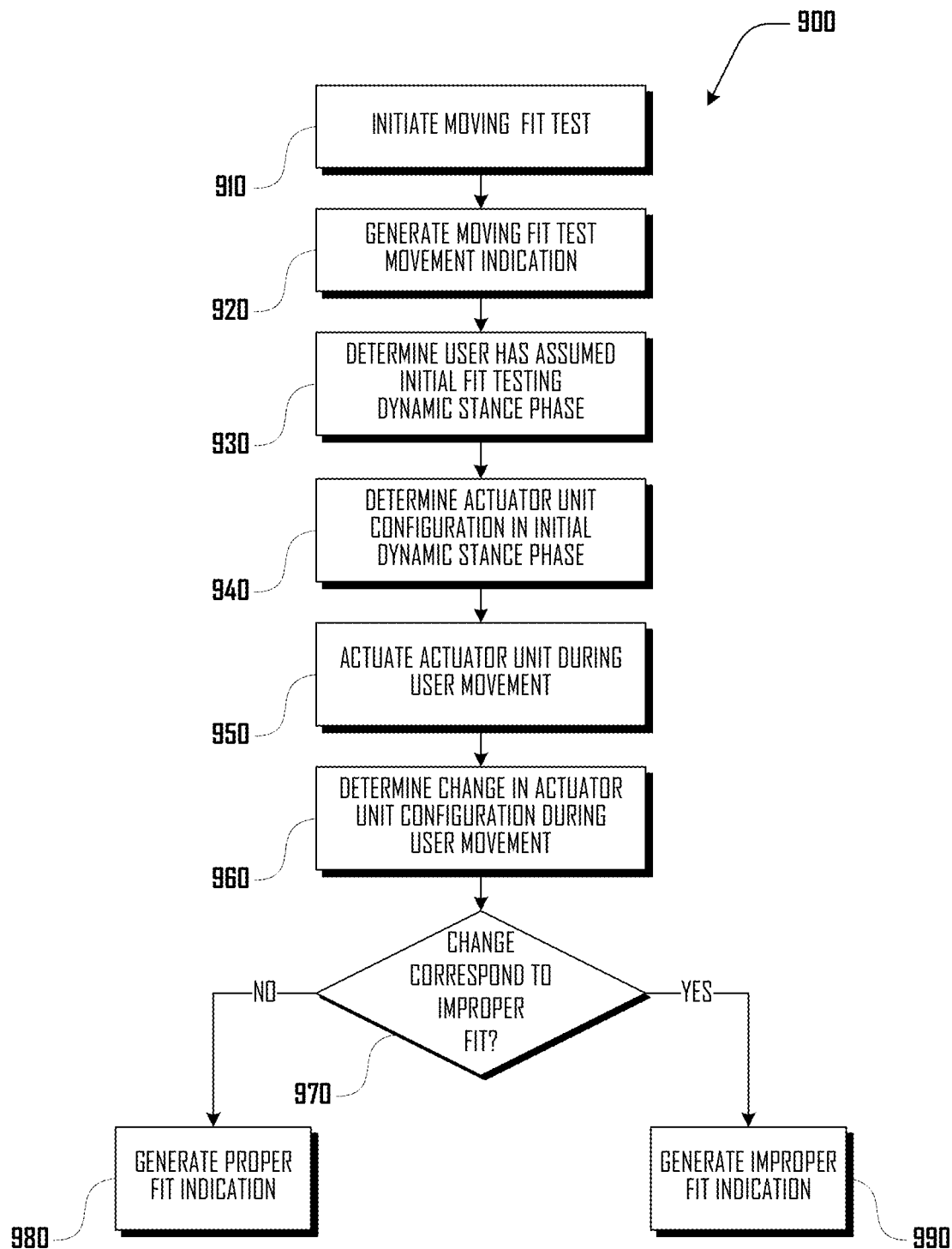

EXOSKELETON FIT EVALUATION SYSTEM AND METHOD

CROSS-REFERENCE TO RELATED APPLICATIONS

This application is a continuation of U.S. patent application Ser. No. 16/116,298, filed Aug. 29, 2018, which is a non-provisional of and claims the benefit of U.S. Provisional Application No. 62/551,664, filed Aug. 29, 2017, which applications are hereby incorporated herein by reference in their entirety and for all purposes.

This application is also related to U.S. patent application Ser. No. 16/855,456, filed Apr. 22, 2020, and is related to U.S. patent application Ser. No. 15/953,296, filed Apr. 13, 2018, and is related to U.S. patent application Ser. No. 15/823,523, filed Nov. 27, 2017, and is related to U.S. patent application Ser. No. 15/082,824, filed Mar. 28, 2016, which applications are also hereby incorporated herein by reference in their entirety and for all purposes.

BACKGROUND

The performance of a powered exoskeleton device can be directly impacted by how well it is fit to the user. A poorly fit device can significantly underperform a properly fit device. Two conventional options for addressing this issue are professional fitting and extensive training material. Professional fitting is impractical for use in more than very controlled settings, and even with extensive training, a normal user is likely to encounter difficulty with fit. In view of the foregoing, a need exists for an improved device to automatically assess the quality of fit of an exoskeleton device on the user in an effort to maintain high levels of performance without requiring professional fitting.

BRIEF DESCRIPTION OF THE DRAWINGS

FIGS. 4a and 4b are example illustrations of a still further embodiment of an exoskeleton system being worn on the leg of a user.

FIG. 8 illustrates a method of performing a static fit test in accordance with an embodiment.

FIG. 9 illustrates a method of performing a moving fit test in accordance with an embodiment.

Figure 1:
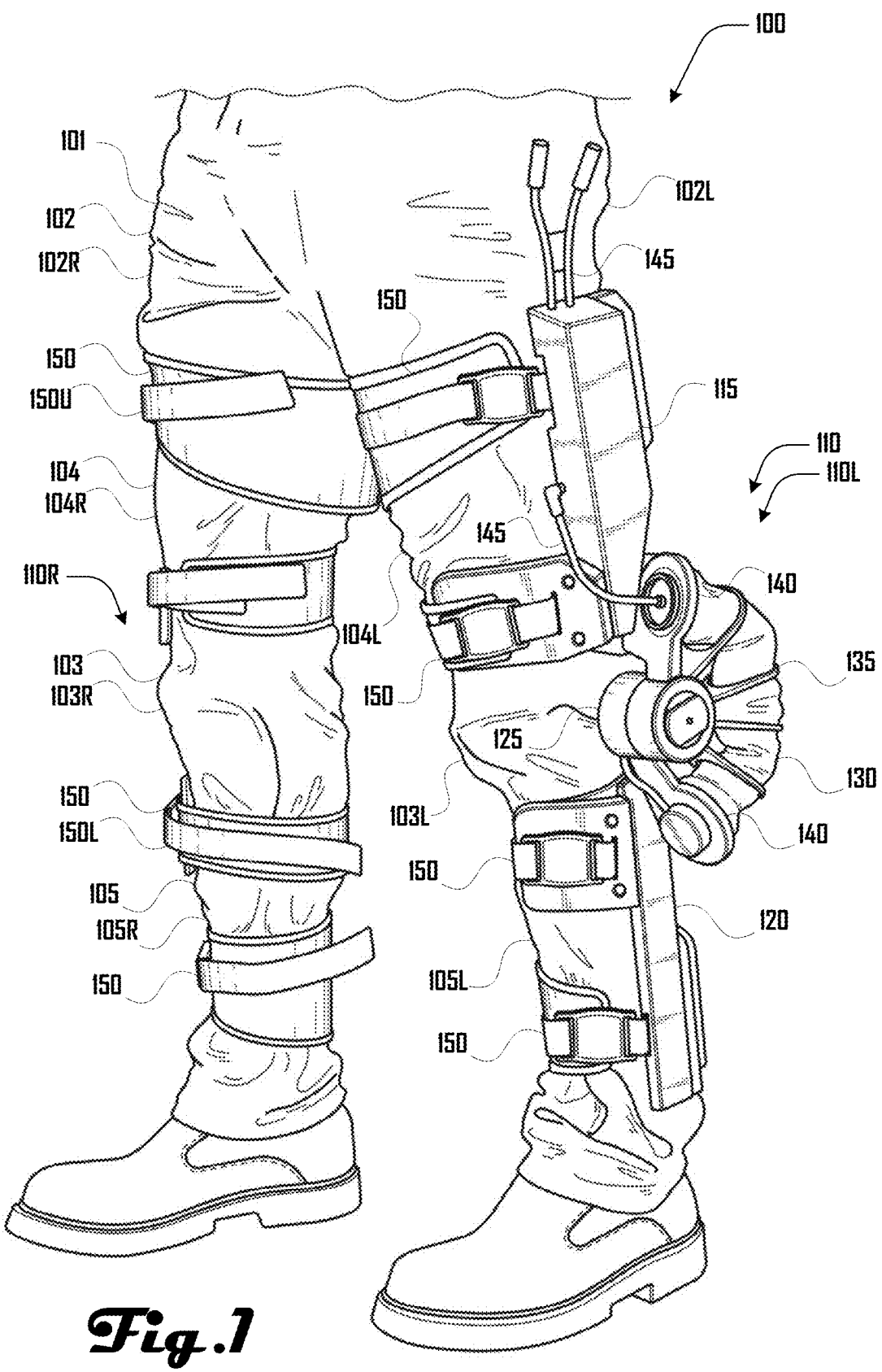
FIG. 1 is an example illustration of an embodiment of an exoskeleton system being worn by a user.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

In one aspect, this application discloses example embodiments pertaining to the use of worn, powered devices (e.g., exoskeletons) configured to automatically evaluate the suitability of device fit on a user. Performance of powered devices on their users can depend on how well the device fits the user's body. Improper fit can degrade performance, and there are currently no options beyond better training material and expert guidance to address this. This disclosure presents a system and method for controlling a device to automatically evaluate the quality of device fit and recommending potential issues and solutions to the user.

In one aspect, this disclosure teaches example methods of using a powered exoskeleton device to assess its own fit on a user. For example, this can be done by interpreting sensor response to an appropriately-controlled application of mechanical power to the user. Various embodiments of such methods and systems that implement such fitting methods are detailed below. For the purposes of this disclosure, some descriptions will consider the scenario of a user who is interacting with a powered knee exoskeleton. This is done for convenience and in no way limits the application of this method to other worn powered devices on other parts of a human or non-human body.

In further aspects, this disclosure relates to systems and methods designed to assess the fit of an exoskeleton on the user. Various embodiments are configured to evaluate the motion of the exoskeleton device in response to a system input of mechanical power while the exoskeleton device and user are in a known configuration. In some embodiments, this can involve a deliberate fit test which is run during device start-up or an intentionally triggered test during device operation. However, other embodiments can use design approaches towards the timing of the application of this method. Other embodiments can include but are not limited to one or more of the following timing approaches: intermittent comparison of unpowered to powered behavior during operation when the device enters one specific state that is occasionally encountered during operation; repeated comparison of unpowered to powered behavior within a device configuration that is regularly encountered during operation; continuous comparison of previous device operation to current device operation under the same mechanical power input conditions to evaluate deviations over time; and the like.

One embodiment includes a method to determine if a knee exoskeleton for skiing is appropriately fit to the leg(s) of a user. It should be stated that the description of this example embodiment is meant for clarity and not intended to limit the application of further embodiments in any way. In one example embodiment, a powered knee exoskeleton designed to assist the knee during skiing applications can be worn on both legs of the user where respective leg exoskeleton units are mechanically connected to the respective thighs and lower legs of a user. For example, upon starting up, the exoskeleton device can direct the user to get into a seated position with knees bent in front of the user with feet firmly fixed to the ground. The user can be directed to assume this position through a visual cue on a cell phone, or in other suitable ways.

Once in the indicated position, the user can begin the device's automated fit evaluation through a button press. At this time, the device can record a baseline of sensor signals in this known, unpowered configuration. The exoskeleton device can then begin to introduce assistive knee torque through its knee actuator. In this embodiment, the fit evaluation can be designed such that the exoskeleton device slowly increases the torque until a predetermined maximum torque is reached, after which the torque is slowly returned to zero. Throughout the powered input in this fixed configuration, the device records data from the device sensors. The device can then compare the behavior of the device under torque to the no torque configuration to determine if the device is sufficiently connected to the user. In this embodiment, the device can compare the measurement of the knee angle from the unpowered configuration to the knee angle from the powered configuration. If the device observes more than a predetermined deviation in knee angle, (e.g., 10 degrees of difference) between the unpowered to powered configuration, then the device can determine that the device is incorrectly fit to the user. This determination can assume that the leg(s) of the user have not deviated significantly from the initial seated position, which, if assumed true, means that any knee angle deviation from the powered input comes from motion of the device relative to the leg, indicating incorrect fit.

Another embodiment includes a method to determine if a knee exoskeleton for medical applications is appropriately fit. In such an embodiment, an exoskeleton device can comprise a single leg, knee exoskeleton designed to provide knee torque assistance during a stationary stance phase of an ambulatory gait. In this embodiment, the exoskeleton device can use the configuration of the leg in stance phase as a known initial baseline configuration. The stance phase can be indicated by a stationary standing posture of the user. In this embodiment, when the user physically enters the stance phase, the device identifies that the stance phase configuration has been entered, either through sensor or user input to the device, and then records a baseline of sensor readings to measure the current configuration of the device. The device can then apply a small torque to provide support for the knee during standing. As the device begins to add this power, the device can monitor the configuration of the device through sensor measurements and can then compare those powered measurements to the baseline configuration measurements.

In this embodiment, the device can use these relative measurements to complete two primary fit assessments. First, the device can evaluate the change in knee angle as a result of introducing power and can determine if the system is poorly fit. Second, the device can identify a specific fit issue that is most indicative of a lower shank or arm of the device not being attached appropriately to the user, so the device can specifically examine the horizontal motion of the lower shank of the device during the powered configuration to determine if it has moved more than is allowable. In various embodiments, the sensors used to detect a knee angle error and the sensors used to detect undesirable lower leg motion can be separate and distinct. After the assessment and determination of an issue, the device can provide the user a warning, alert, or the like (e.g., "device strapping should be tightened", or that "the lower leg strap should be tightened") depending on which fit failure is identified.

Another embodiment includes a method to evaluate the fit of an ankle exoskeleton for walking applications. For example, the device can evaluate the fit of the exoskeleton device on the user in a plurality of dynamic stance phases throughout the user's walking gait. In one example, when the foot contacts the ground, the system can collect initial measurements regarding the configuration of the device and the initial unpowered motion of the device. The device can be attached to the foot and to the lower shank of the user.

In a dynamic stance phase of walking behaviors in various examples, the lower shank mainly rotates around the user's ankle joint. Therefore, the part of the device connected to the shank should mainly rotate about the ankle joint in a similar fashion in such examples. Power can be introduced to the ankle exoskeleton after ground contact is detected to assist the user's walking behavior. The system can collect measurements of the motion of the device during this powered configuration. The system can then compare powered and unpowered sensor signals. In such an embodiment, the comparison can be made to evaluate if the device is moving appropriately with the lower shank in an arc about the ankle joint or if the device is translating up the lower shank of the user. If the device is translating up the leg of the user above a threshold amount, the exoskeleton system can identify that the poor fit criteria has been met or a poor fit threshold has been reached and can limit the power applied by the device while issuing a prompt to the user to tighten the lower leg strapping.

Various examples of the present disclosure are presented in the context of a knee exoskeleton; however, further embodiments relate to other worn powered devices, which can include but are not limited to: knee exoskeletons, ankle exoskeletons, hip exoskeletons, elbow exoskeletons, shoulder exoskeletons, wrist exoskeletons, back exoskeletons, neck exoskeletons, exoskeletons with any combination of these joints, wearables, footwear, and more specifically active footwear. In the case of wearables and footwear, the power addition does not need to be torque addition at a joint for this method to be applicable. Devices that change stiffness or adjust tightness on a user can also leverage the same systems and methods in various alternative embodiments.

Turning to FIG. 1, an example of an embodiment of an exoskeleton system 100 being worn by a human user 101 is illustrated. As shown in this example, the exoskeleton system 100 comprises a left and right leg actuator unit 110L, 110R that are respectively coupled to a left and right leg 102L, 102R of the user. In this example illustration, portions of the right leg actuator unit 110R are obscured by the right leg 102R; however, it should be clear that in various embodiments the left and right leg actuator units 110L, 110R can be substantially mirror images of each other.

The leg actuator units 110 can include an upper arm 115 and a lower arm 120 that are rotatably coupled via a joint 125. A bellows actuator 130 extends between plates 140 that are coupled at respective ends of the upper arm 115 and lower arm 120, with the plates 140 coupled to separate rotatable portions of the joint 125. A plurality of constraint ribs 135 extend from the joint 125 and encircle a portion of the bellows actuator 130 as described in more detail herein. One or more sets of pneumatic lines 145 can be coupled to the bellows actuator 130 to introduce and/or remove fluid from the bellows actuator 130 to cause the bellows actuator 130 to expand and contract as discussed herein.

The leg actuator units 110L, 110R can be respectively coupled about the legs 102L, 102R of the user 101 with the joints 125 positioned at the knees 103L, 103R of the user 101 with the upper arms 115 of the leg actuator units 110L, 110R being coupled about the upper legs portions 104L, 104R of the user 101 via one or more couplers 150 (e.g., straps that surround the legs 104). The lower arms 120 of the leg actuator units 110L, 110R can be coupled about the lower leg portions 105L, 105R of the user 101 via one or more couplers 150. As shown in the example of FIG. 1, an upper arm 115 can be coupled to the upper leg portion 104 of a leg 102 above the knee 103 via two couplers 150 and the lower arm 120 can be coupled to the lower leg portion 105 of a leg 102 below the knee 103 via two couplers 150. It is important to note that some of these components can be omitted in certain embodiments, some of which are discussed within. Additionally, in further embodiments, one or more of the components discussed herein can be operably replaced by an alternative structure to produce the same functionality.

Figure 2:
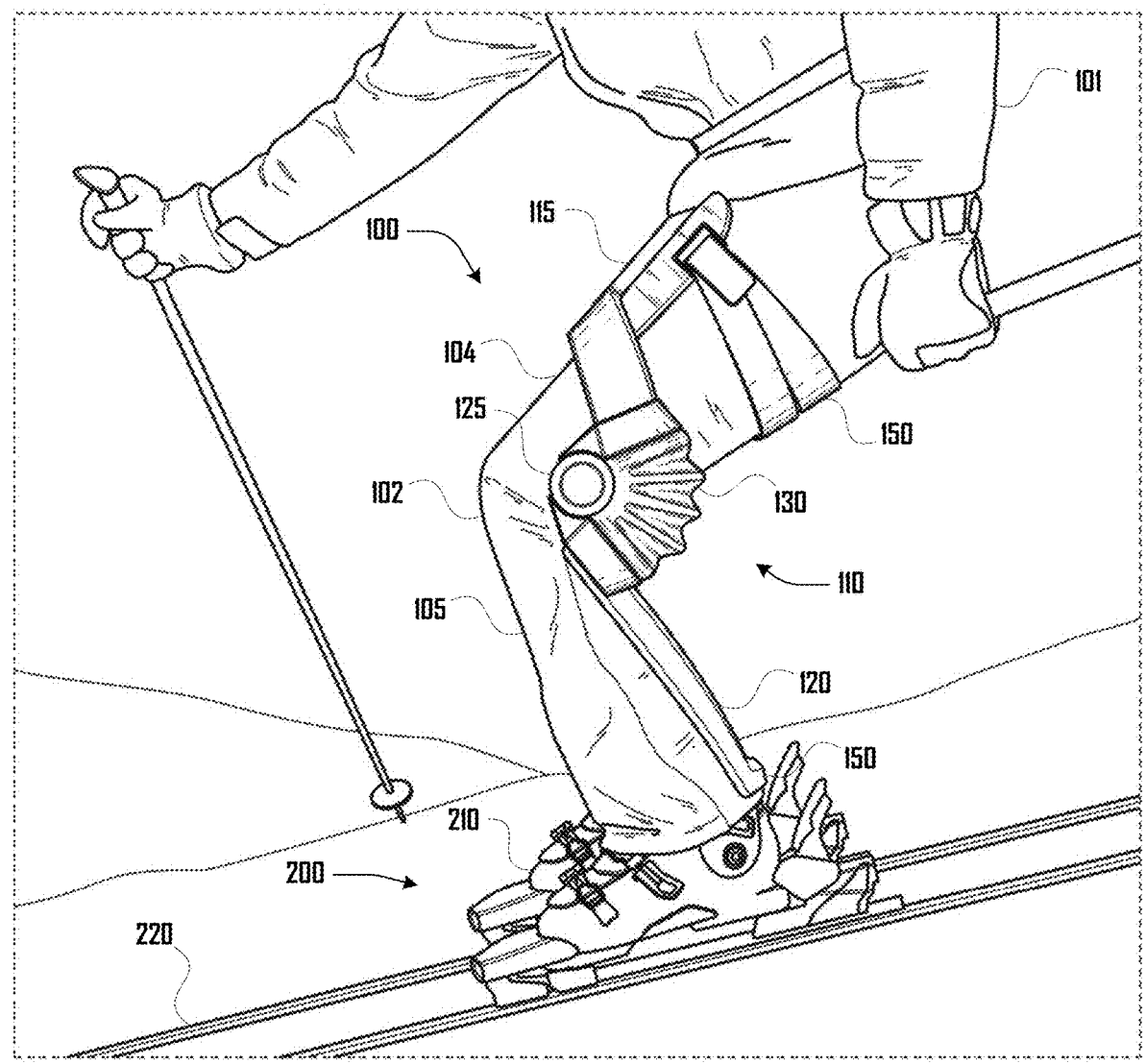
FIG. 2 is an example illustration of another embodiment of an exoskeleton system being worn by a user while skiing.
Figure 3:
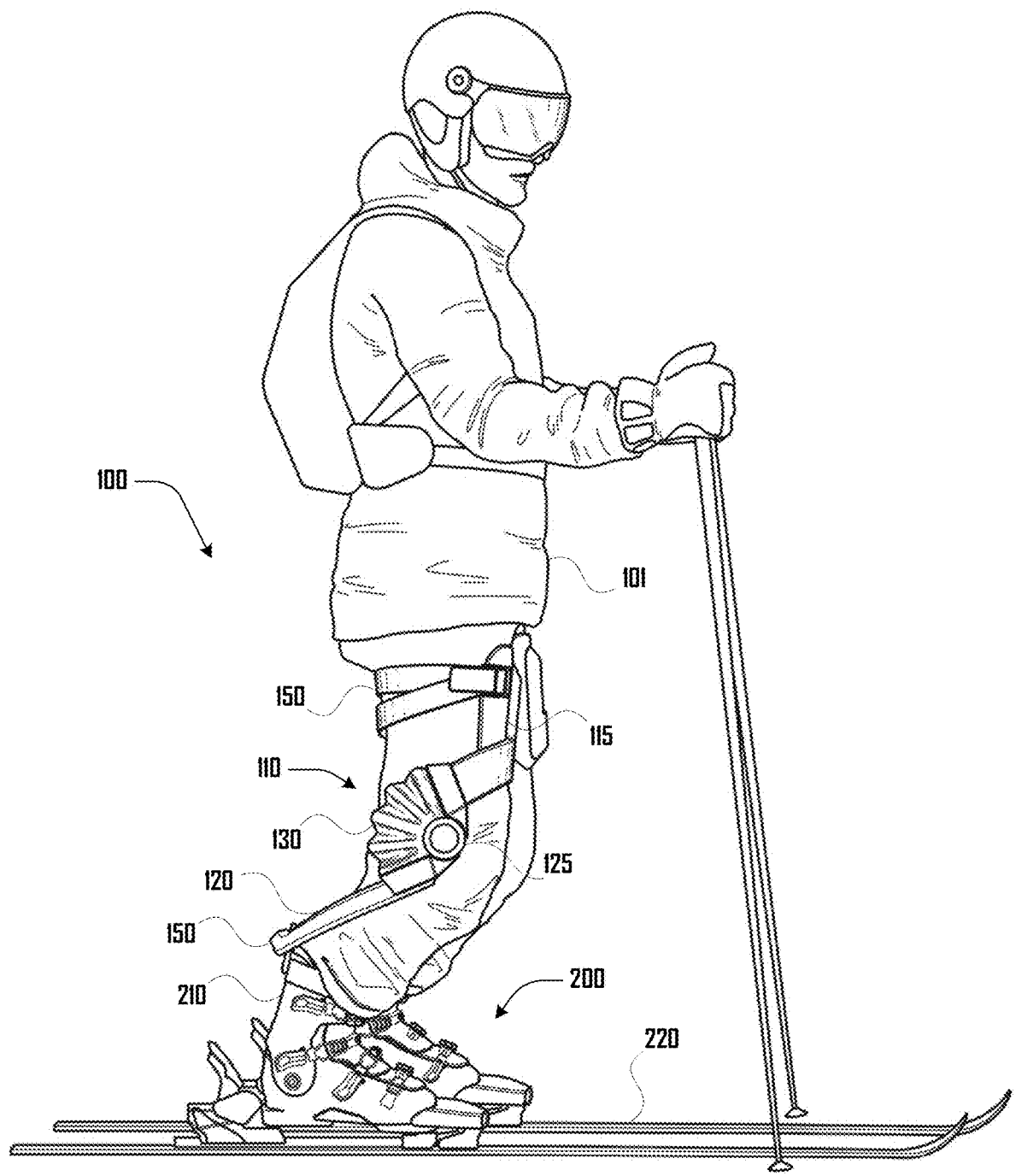
FIG. 3 is an example illustration of a further embodiment of an exoskeleton system being worn by a user while skiing.

As discussed herein, an exoskeleton system 100 can be configured for various suitable uses. For example, FIGS. 2 and 3 illustrate an exoskeleton system 100 being used by a user during skiing. As shown in FIGS. 2 and 3, the user can wear the exoskeleton system 100 and a skiing assembly 200 that includes a pair of ski boots 210 and pair of skis 220. In various embodiments, the lower arms 120 of the leg actuator units 110 can be removably coupled to the ski boots 210 via a coupler 150. Such embodiments can be desirable for directing force from the leg actuator units 110 to the skiing assembly. For example, as shown in FIGS. 2 and 3, a coupler 150 at the distal end of the lower arm 120 can couple the leg actuator unit 110 to the ski boot 210, and a coupler 150 at the distal end of the upper arm 115 can couple the leg actuator unit 110 to the upper leg 104 of the user 101.

The upper and lower arms 115, 120 of a leg actuator unit 110 can be coupled to the leg 102 of a user 101 in various suitable ways. For example, FIG. 1 illustrates an example where the upper and lower arms 115, 120 and joint 125 of the leg actuator unit 110 are coupled along lateral faces of the top and bottom portions 104, 105 of the leg 102. FIGS. 4a and 4b illustrate another example of an exoskeleton system 100 where the joint 125 is disposed laterally and adjacent to the knee 103 with a rotational axis K of the joint 125 being disposed coincident with a rotational axis of the knee 103. The upper arm 115 can extend from the joint 125 along a lateral face of the upper leg 104 to an anterior face of the upper leg 104. The portion of the upper arm 115 on the anterior face of the upper leg 104 can extend along an axis U. The lower arm 120 can extend from the joint 125 along a lateral face of the lower leg 105 from a medial location at the joint 125 to a posterior location at a bottom end of the lower leg 105 with a portion extending along axis L that is perpendicular to axis K.

In various embodiments, the joint structure 125 can constrain the bellows actuator 130 such that force created by actuator fluid pressure within the bellows actuator 130 can be directed about an instantaneous center (which may or may not be fixed in space). In some cases of a revolute or rotary joint, or a body sliding on a curved surface, this instantaneous center can coincide with the instantaneous center of rotation of the joint 125 or a curved surface. Forces created by a leg actuator unit 110 about a rotary joint 125 can be used to apply a moment about an instantaneous center as well as still be used to apply a directed force. In some cases of a prismatic or linear joint (e.g., a slide on a rail, or the like), the instantaneous center can be kinematically considered to be located at infinity, in which case the force directed about this infinite instantaneous center can be considered as a force directed along the axis of motion of the prismatic joint. In various embodiments, it can be sufficient for a rotary joint 125 to be constructed from a mechanical pivot mechanism. In such an embodiment, the joint 125 can have a fixed center of rotation that can be easy to define, and the bellows actuator 130 can move relative to the joint 125. In a further embodiment, it can be beneficial for the joint 125 to comprise a complex linkage that does not have a single fixed center of rotation. In yet another embodiment, the joint 125 can comprise a flexure design that does not have a fixed joint pivot. In still further embodiments, the joint 125 can comprise a structure, such as a human joint, robotic joint, or the like.

In various embodiments, leg actuator unit 110 (e.g., comprising bellows actuator 130, joint structure 125, constraint ribs 135 and the like) can be integrated into a system to use the generated directed force of the leg actuator unit 110 to accomplish various tasks. In some examples, a leg actuator unit 110 can have one or more unique benefits when the leg actuator unit 110 is configured to assist the human body or is included into a powered exoskeleton system 100. In an example embodiment, the leg actuator unit 110 can be configured to assist the motion of a human user about the user's knee joint 103. To do so, in some examples, the instantaneous center of the leg actuator unit 110 can be designed to coincide or nearly coincide with the instantaneous center of rotation of the knee (e.g., aligned along common axis K as shown in FIG. 4a). In one example configuration, the leg actuator unit 110 can be positioned lateral to the knee joint 103 as shown in FIGS. 1, 2, 3, and 4a (as opposed to in front or behind). In another example configuration, the leg actuator unit 110 can be positioned behind the knee 103, in front of the knee 103, on the inside of the knee 103, or the like. In various examples, the human knee joint 103 can function as (e.g., in addition to or in place of) the joint 125 of the leg actuator unit 110.

For clarity, example embodiments discussed herein should not be viewed as a limitation of the potential applications of the leg actuator unit 110 described within this disclosure. The leg actuator unit 110 can be used on other joints of the body including but not limited to the elbow, hip, finger, spine, or neck, and in some embodiments, the leg actuator unit 110 can be used in applications that are not on the human body such as in robotics, for general purpose actuation, or the like.

Some embodiments can apply a configuration of a leg actuator unit 110 as described herein for linear actuation applications. In an example embodiment, the bellows 130 can comprise a two-layer impermeable/inextensible construction, and one end of the constraining ribs 135 can be fixed to the bellows 130 at predetermined positions. The joint structure 125 in various embodiments can be configured as a series of slides on a pair of linear guide rails, where the remaining end of each constraining rib 135 is connected to a slide. The motion and force of the fluidic actuator can therefore be constrained and directed along the linear rail.

Figure 5:
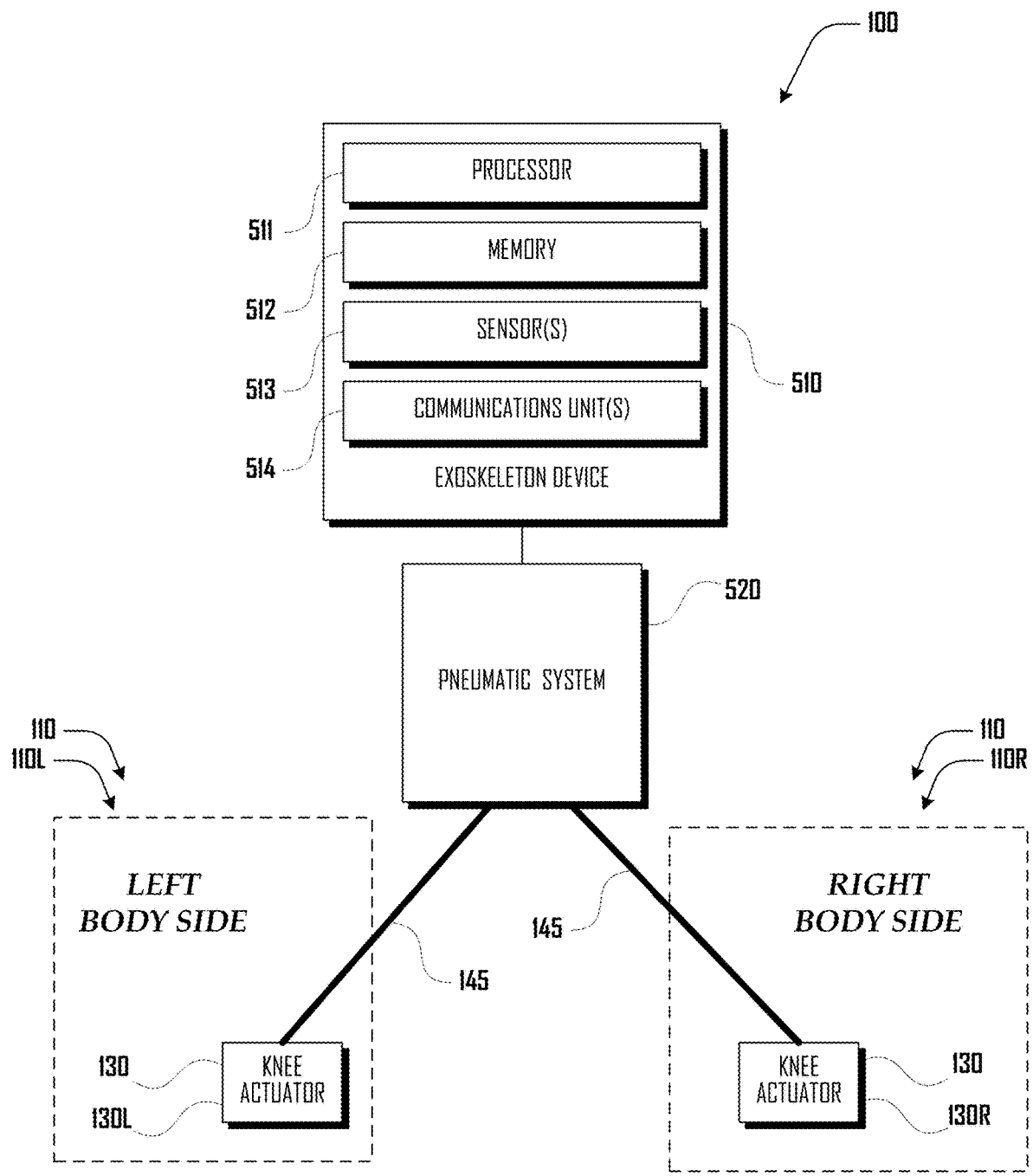
FIG. 5 is a block diagram illustrating an embodiment of an exoskeleton system.

FIG. 5 is a block diagram of an example embodiment of an exoskeleton system 100 that includes an exoskeleton device 510 that is operably connected to a pneumatic system 520. The exoskeleton device 510 comprises a processor 511, a memory 512, one or more sensors 513 and a communication unit 514. A plurality of actuators 130 are operably coupled to the pneumatic system 520 via respective pneumatic lines 145. The plurality of actuators 130 include a pair of knee-actuators 130L, 130R that are positioned on the right and left side of a body 100. For example, as discussed above, the example exoskeleton system 100 shown in FIG. 5 can comprise a left and right leg actuator unit 110L, 110R on respective sides of the body 101 as shown in FIGS. 1-3.

In various embodiments, the example system 100 can be configured to move and/or enhance movement of the user wearing the exoskeleton system 110. For example, the exoskeleton device 510 can provide instructions to the pneumatic system 520, which can selectively inflate and/or deflate the bellows actuators 130 via pneumatic lines 145. Such selective inflation and/or deflation of the bellows actuators 130 can move one or both legs 102 to generate and/or augment body motions such as walking, running, jumping, climbing, lifting, throwing, squatting, skiing or the like. In further embodiments, the pneumatic system 520 can be manually controlled, configured to apply a constant pressure, or operated in any other suitable manner.

In some embodiments, such movements can be controlled and/or programmed by the user 101 that is wearing the exoskeleton system 100 or by another person. In some embodiments, the exoskeleton system 100 can be controlled by movement of the user. For example, the exoskeleton device 510 can sense that the user is walking and carrying a load and can provide a powered assist to the user via the actuators 130 to reduce the exertion associated with the load and walking. Similarly, where a user 101 wears the exoskeleton system 100 while skiing, the exoskeleton system 100 can sense movements of the user 101 (e.g., made by the user 101, in response to terrain, or the like) and can provide a powered assist to the user via the actuators 130 to enhance or provide an assist to the user while skiing.

Accordingly, in various embodiments, the exoskeleton system 130 can react automatically without direct user interaction. In further embodiments, movements can be controlled in real-time by a controller, joystick or thought control. Additionally, some movements can be pre-preprogrammed and selectively triggered (e.g., walk forward, sit, crouch) instead of being completely controlled. In some embodiments, movements can be controlled by generalized instructions (e.g. walk from point A to point B, pick up box from shelf A and move to shelf B).

In various embodiments, the exoskeleton device 100 can be operable to perform methods or portions of methods described in more detail below or in related applications incorporated herein by reference. For example, the memory 512 can include non-transient computer readable instructions, which if executed by the processor 511, can cause the exoskeleton system 100 to perform methods or portions of methods described herein or in related applications incorporated herein by reference. The communication unit 514 can include hardware and/or software that allow the exoskeleton system 100 to communicate with other devices, including a user device, a classification server, other exoskeleton systems, or the like, directly or via a network.

In some embodiments, the sensors 513 can include any suitable type of sensor, and the sensors 513 can be located at a central location or can be distributed about the exoskeleton system 100. For example, in some embodiments, the exoskeleton system 100 can comprise a plurality of accelerometers, force sensors, position sensors, pressure sensors, and the like, at various suitable positions, including at the arms 115, 120, joint 125, actuators 130 or any other location. Accordingly, in some examples, sensor data can correspond to a physical state of one or more actuators 130, a physical state of a portion of the exoskeleton system 100, a physical state of the exoskeleton system 100 generally, and the like. In some embodiments, the exoskeleton system 100 can include a global positioning system (GPS), camera, range sensing system, environmental sensors, or the like.

The pneumatic system 520 can comprise any suitable device or system that is operable to inflate and/or deflate the actuators 130 individually or as a group. For example, in one embodiment, the pneumatic system can comprise a diaphragm compressor as disclosed in related patent application Ser. No. 14/577,817 filed Dec. 19, 2014 and/or a poppet valve system as described in U.S. patent application Ser. No. 15/083,015, filed Mar. 28, 2016, which issued as U.S. Pat. No. 9,995,321.

As discussed herein, various suitable exoskeleton systems 100 can be used in various suitable ways and for various suitable applications. However, such examples should not be construed to be limiting on the wide variety of exoskeleton systems 100 or portions thereof that are within the scope and spirit of the present disclosure. Accordingly, exoskeleton systems 100 that are more or less complex than the examples of FIGS. 1, 2, 3, 4a, 4b and 5 are within the scope of the present disclosure.

Additionally, while various examples relate to an exoskeleton system 100 associated with the legs or lower body of a user, further examples can be related to any suitable portion of a user body including the torso, arms, head, legs, or the like. Also, while various examples relate to exoskeletons, it should be clear that the present disclosure can be applied to other similar types of technology, including prosthetics, body implants, robots, or the like. Further, while some examples can relate to human users, other examples can relate to animal users, robot users, various forms of machinery, or the like.

Figure 6B:
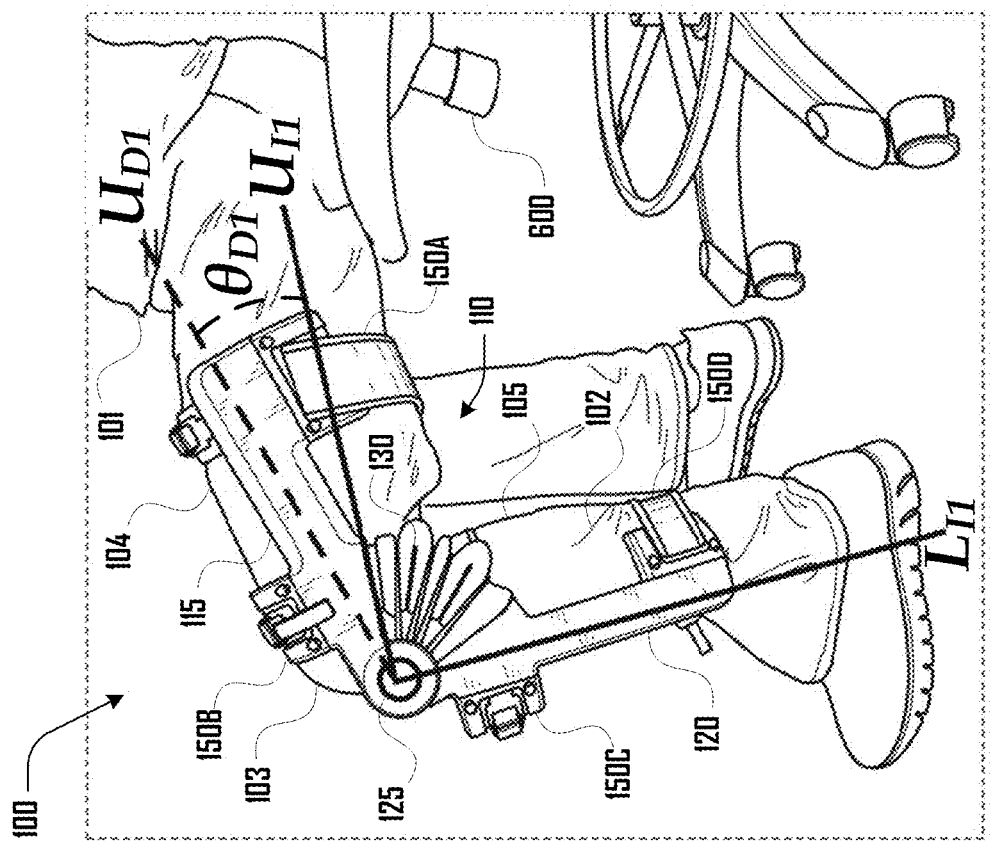
FIG. 6b illustrates the exoskeleton system of FIG. 6a in an actuated state during the fit test, the actuated state generating a displacement of an upper arm of the exoskeleton system.
Figure 6A:
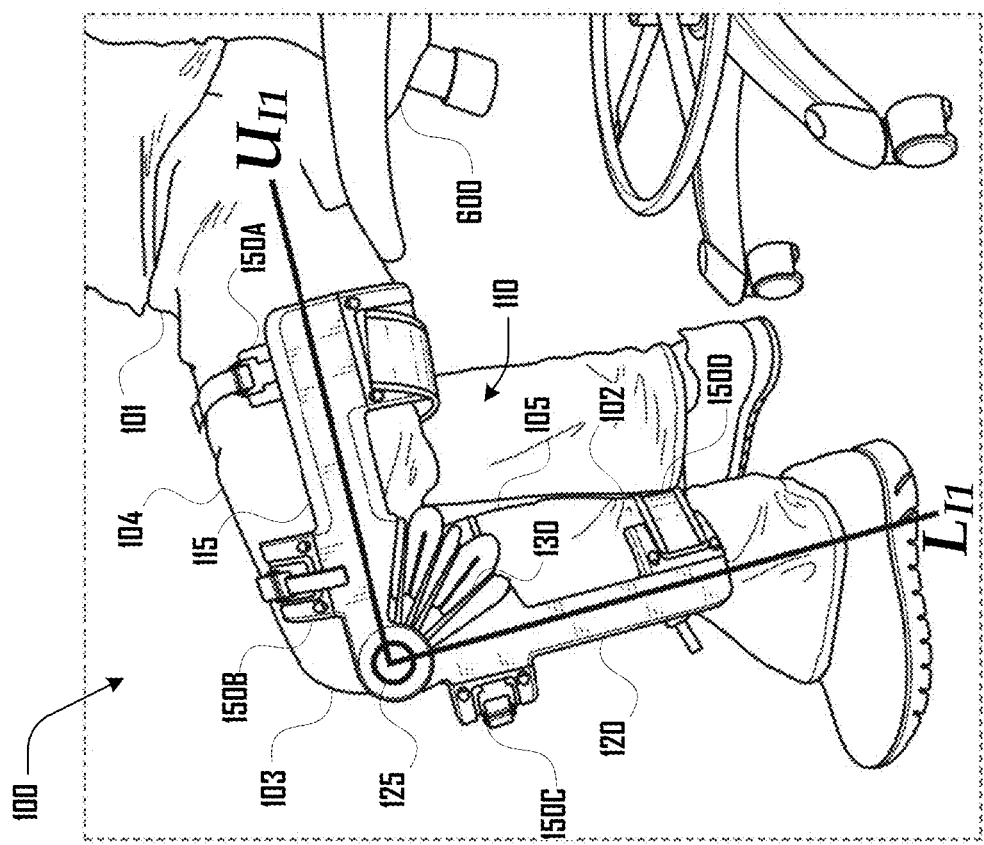
FIG. 6a illustrates an exoskeleton system worn by a user during a fit test, the exoskeleton system being in an un-actuated state.

FIG. 6a illustrates an exoskeleton system 100 being worn by a user 101 during a fit test. The user 101 is shown sitting in a chair 600 with the leg 102 having the exoskeleton system 100 in a bent configuration such that the lower arm 120 is disposed along axis $L_{11}$ and the upper arm 115 is disposed along axis $U_{11}$.

The exoskeleton system 100 in FIG. 6a is shown in a non-actuated state. For example, the actuator 130 can be in an unpowered or neutral state where the actuator 130 does not apply force to the upper and lower arms 115, 120 toward a linear configuration or away from a linear configuration. However, in various embodiments, such an unpowered or neutral state of the actuator 130 can include a nominal force being applied to the upper and lower arms 115, 120, with such a nominal force providing rigidity to the exoskeleton system 100 without pushing or pulling the upper and lower arms 115, 120.

In contrast, FIG. 6b illustrates the exoskeleton system of FIG. 6a in an actuated state during the fit test, the actuated state applying force to the upper and lower arms 115, 120 toward a linear configuration and generating a displacement of an upper arm 115 of the exoskeleton system 100. As discussed herein, a leg actuator unit 110 of an exoskeleton system 100 can be secured to a leg 102 of a user 101 via a plurality of couplers 150. In the example of FIGS. 6a and 6b, the upper arm 115 is secured to the upper leg portion 104 via a first and second coupler 150A, 150B and the lower arm 120 is secured to the lower leg portion 105 via a third and fourth coupler 150C, 150D.

In various embodiments, the couplers 150 can comprise straps that surround portions of the leg 102 of the user 101 such that the upper and lower arms 115, 120 are securely coupled to the upper and lower portions 104, 105 of the leg 102 so that movement of the upper and lower arms 115, 120 generates movement of the leg 102 about the knee 103 without substantial movement of the upper and lower arms 115, 120 relative to the upper and lower portions 104, 105 of the leg 102. However, where one or more of the couplers 150 are not securely fastened about the leg 102, actuation of the upper and lower arms 115, 120 can result in displacement of one or both upper and lower arms 115, 120 about the upper and/or lower portions 104, 105 of the leg 102.

For example, as shown in FIG. 6b compared to FIG. 6a, actuation of the exoskeleton system 100 has resulted in displacement of the upper arm 115 relative to the upper portion 104 of the leg 102 by an angle $\theta_{D1}$ defined by difference between the upper arm initial axis $U_{11}$ and the resulting upper arm displacement axis $U_{D1}$. In various examples, such a displacement of the upper arm 115 can be caused by at least the first coupler 150A being inadequately secured to the upper portion 104 of the leg 102 or caused by both the first and second couplers 150A, 150B being inadequately secured to the upper portion 104 of the leg 102.

However, it should be noted that in the example of FIGS. 6a and 6b, the lower arm 120 does not experience displacement about the lower portion 105 of the leg 102. In other words, the lower arm 120 substantially maintains alignment along axis $L_{11}$ while the exoskeleton system 100 is in both the un-actuated and actuated states of FIGS. 6a and 6b respectively. In various examples, such maintaining alignment along axis $L_{11}$ while the exoskeleton system 100 is in both the un-actuated and actuated states can be due to one or both of the third and fourth couplers 150C, 150D being suitably securely coupled to the lower portion 105 of the leg 102.

Figure 7A:
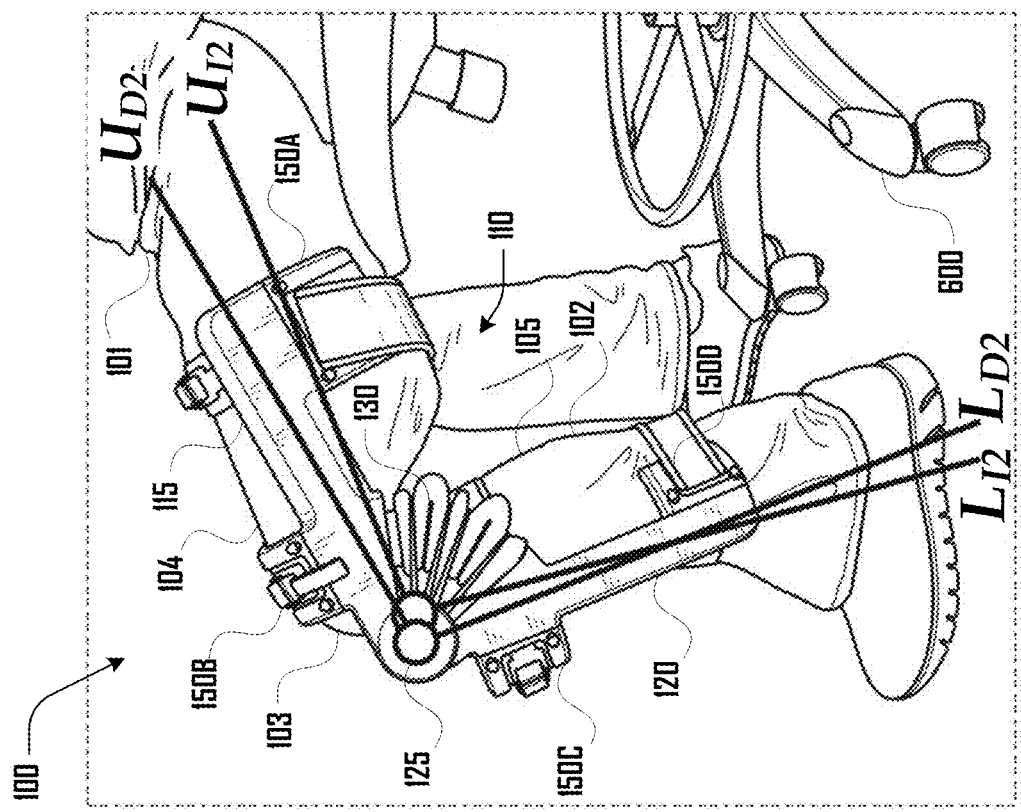
FIG. 7a illustrates an exoskeleton system worn by a user during a fit test, the exoskeleton system being in an un-actuated state.
Figure 7B:
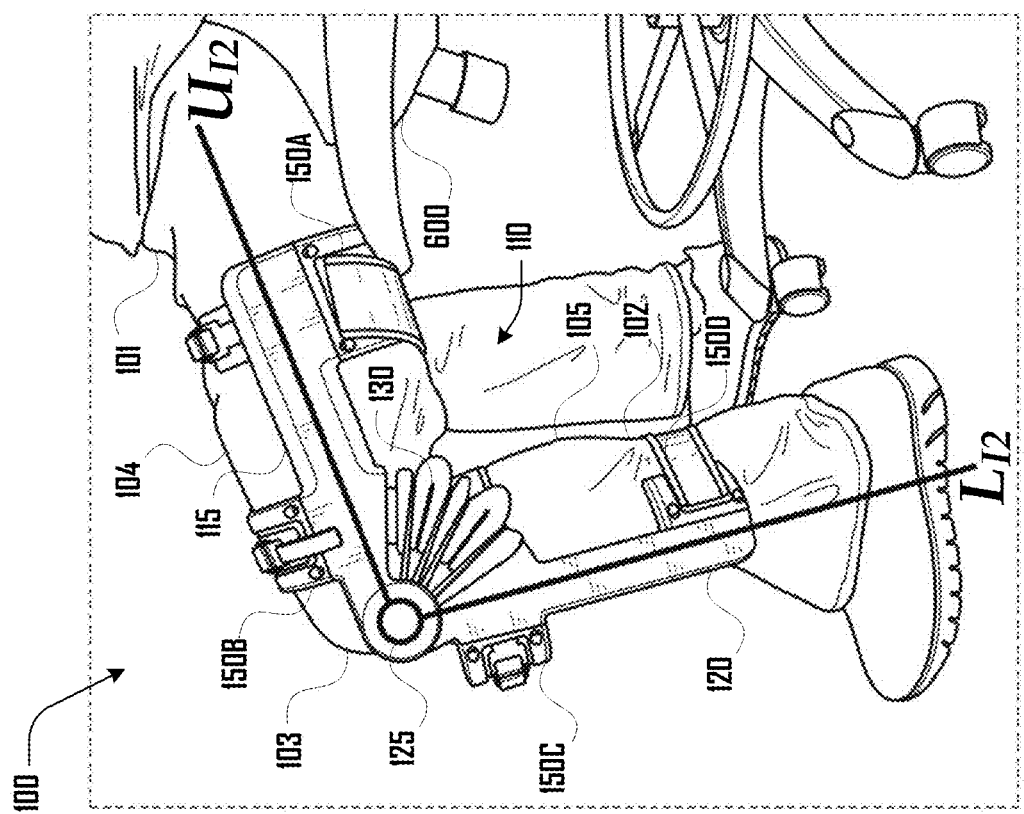
FIG. 7b illustrates the exoskeleton system of FIG. 7a in an actuated state during the fit test, the actuated state generating a displacement of an upper and lower arm of the exoskeleton system.

In further examples, both the upper and lower arms 115, 120 can experience displacement about the leg 102 from an un-actuated state to an actuated state. FIGS. 7a and 7b illustrate such an example. Specifically, FIG. 7a illustrates the exoskeleton system 100 in an un-actuated configuration (e.g., as in FIG. 6a), with FIG. 7b illustrating exoskeleton system 100 in an actuated configuration (e.g., as in FIG. 6b). However, in contrast to FIG. 6b, both the upper and lower arms 115, 120 can experience displacement about the leg 120 with the upper and lower arms 115, 120 initially being disposed along axes $U_{12}$, $L_{12}$ in the unactuated state shown in FIG. 7a and being respectively displaced to axes $U_{12}$, $L_{12}$ in the actuated state shown in FIG. 7b.

Such displacement can be caused by one or more of the first, second, third and fourth couplers 150A, 150B, 150C, 150D being inadequately secured to the leg 102. For example, one or both of the first and second couplers 150A, 150B can be inadequately secured to the upper portion 104 of the leg 102, and one or both of the third and fourth couplers 150C, 150D can be inadequately secured to the lower portion 105 of the leg 102. Additionally, in this example, the joint 125 is also shown being displaced between FIGS. 7a and 7b.

While the examples of FIGS. 6a, 6b, 7a and 7b illustrate an exoskeleton system 100 having at least one leg actuator unit 110 with the upper arm 115 secured to the upper leg portion 104 via a first and second coupler 150A, 150B and the lower arm 120 secured to the lower leg portion 105 via a third and fourth coupler 150C, 150D, further configurations of couplers 150 and/or exoskeleton systems 100 are also within the scope of the present disclosure and the examples of FIGS. 6a, 6b, 7a and 7b should not be construed to be limiting on the wide variety of alternative embodiments. For example, in some embodiments, an upper arm 115 and lower arm 120 of a leg actuator unit 110 can respectively comprise one or more couplers 150, including one, two, three, four, five, ten, fifteen, twenty, or the like.

As discussed herein, in various embodiments a fit test can be performed to identify issues with the fit of an exoskeleton system 100 to a user 101. For example, a fit test can determine whether one or more couplers 150 of an exoskeleton system 100 are improperly fit or secured to the user 101. Such fit tests can be conducted while the user 101 is static or moving.

Turning to FIG. 8, a method 800 of performing a static fit test is illustrated, which in some examples can be performed by an exoskeleton device 510 of an exoskeleton system 100 (see e.g., FIG. 5). The method begins at 810 where a static fit test is initiated. For example, in some embodiments, a static fit test can be part of an exoskeleton system startup or power-on routine once the exoskeleton system 100 has been coupled to a user 101 or can be performed at any desirable time (e.g., when initiated by the user 101, a technician, or automatically based on a determination of exoskeleton performance issues).

At 820, a fit testing position indication is generated, and at 830 a determination is made that the user has assumed the fit testing position. For example, a fit test can be designed to be performed with the user 101 and exoskeleton system 100 in a specific configuration, and the fit testing position indication can include an instruction for the user 101 to assume the specific configuration that the test should be performed in. Such an instruction can include an audio, visual and/or haptic indication (e.g., via an exoskeleton device 510, a smartphone associated with the exoskeleton system 100, or the like). Determining that the user 101 has assumed the fit testing position can be based on sensor data from the exoskeleton device 100, based on an indication from a user 101 (e.g., a button press), and the like.

The static position that the test is to be performed in can be various suitable positions, which may or may not be selectable (e.g., by a user 101, technician, or automatically). For example, the test position can include a sitting position with at least one leg 102 of the user 101 in a bent configuration as shown in FIGS. 6a, 6b, 7a and 7b or a standing position with the exoskeleton system 100 in a generally linear and extended configuration.

At 840, the configuration of an actuator unit 110 of the exoskeleton device 100 can be determined. For example, the configuration of the actuator unit 110 can be determined based on sensor data from one or more sensors 513 of the actuator unit 110, such as one or more rotary encoder, torque sensor, gyroscope, force sensor, accelerometer, position sensor, and the like, associated with various suitable portions of the actuator unit 110 including the upper arm 115, lower arm 120, joint 125, and the like. While some embodiments can use data from a large plurality of sensors 115 disposed in separate locations of an actuator unit 110, further examples can use data from a limited number of sensors 115 in a limited number of locations of the actuator unit 110. For example, one embodiment can rely only on data from a single encoder. Another embodiment can rely only on data from a single encoder and a single torque sensor.

Returning to the method 800, at 850, the actuator unit 110 is actuated with the user remaining in the fit testing position, and at 860 a change in actuator unit configuration during actuation of the actuator unit 110 is determined. For example, actuation of the actuator unit 110 can comprise inflation and/or deflation of a bellows actuator 130 or other suitable type of actuator (e.g., electric actuator, pneumatic actuator, or the like). In some embodiments, actuation can be in a single direction compared to the starting configuration. For example, using FIGS. 6a, and 6b as an illustration, the bellows actuator 130 can be inflated to apply force to increase the angle between the upper and lower arms 115, 120, which in this example generates a determined displacement change of the upper arm 115 of $\theta_{D1}$.

However, in further embodiments, actuation during a fit test can include actuation in two directions from a starting point. For example, in addition to actuating the actuator unit 110 to apply force to increase the angle between the upper and lower arms 115, 120, force can also be applied to decrease the angle between the upper and lower arms 115, 120. Where both a positive and negative displacement is generated from such a positive and negative actuation during a fit test, such determined positive and negative displacements can be considered separately and/or together. Similarly, displacements as shown in FIGS. 7a and 7b can be generated and identified.

Actuation of the actuation unit can be done in various suitable ways. Using FIGS. 6a and 6b as an example, in one embodiment, starting at the initial configuration of FIG. 6a, increasing force can be applied by the actuator 130 until a maximum torque threshold is reached and a determined displacement can be calculated based on the change in configuration from the starting point to the configuration at the maximum torque threshold. In another example, increasingly pulsing force can be applied by the actuator 130 until a maximum torque threshold is reached. In a further embodiment, increasing force in a first direction can be applied by the actuator 130 until a maximum torque threshold is reached; and then increasing force in a second direction can be applied by the actuator 130 until a maximum torque threshold is reached. Cycling between the first and second direction (e.g., positive and negative direction) can occur any suitable plurality of times in some embodiments.

A power profile applied during a fit test can be different in some embodiments. In one embodiment, the exoskeleton system 100 can provide a constant application at a comfortably low torque. The exoskeleton system 100 can then use onboard sensors to assess the appropriateness of the fit. In another embodiment, the exoskeleton will apply torque in a non-constant state. A specific embodiment of this method applies torque to the operator at a set frequency, 1 Hz for example. By applying the torque at a set frequency, the onboard sensors will be able to assess different aspects of the device fit on the operator. The above embodiments are provided as description and are not meant in any way to limit the possible methods for applying torque which, for clarity, can include but are not limited to the following: constant, fixed frequency, variable frequency, various constant forces, random pulses, and the like.

Returning to the method 800, at 870 a determination is made whether the change in the configuration of the actuator unit 110 during actuation corresponds to an improper fit of the actuator unit 110 to the user 101. If the determined configuration change is determined to not correspond to an improper fit, then at 880, a proper fit indication is generated. However, if the determined configuration change is determined to correspond to an improper fit, then at 890, an improper fit indication is generated. Additionally, in some embodiments, where a determination of improper fit is made, power, actuation capacity, range of motion, or other capability of the exoskeleton system 100 can be limited for the safety of the user 101 until a subsequent fit test determines proper fit to a user 101.

Determining whether a change in the configuration of the actuator unit 110 during actuation corresponds to an improper fit of the actuator unit 110 to the user 101 can be done in various suitable ways. For example, where a displacement of one or both of the upper and lower arm 115, 120 (e.g., displacement angle $\theta_{D_1}$ of FIG. 6b or displacement shown in FIG. 7b) is determined to be at or above a defined threshold, then a determination can be made that such a displacement or change in the configuration of the actuator unit 110 during actuation corresponds to an improper fit of the actuator unit 110 to the user 101. In examples where test actuation occurs in more than one direction from an initial configuration, a determination can be made whether displacement or change in either direction exceeds a threshold or a determination can be made whether combined displacement or change in both directions exceeds a threshold.

In another embodiment, the actuation unit 110 provides a time-varying torque while the user 101 maintains a fixed position as discussed herein. In this case, the exoskeleton system 100 can use sensors (e.g., sensors 513) to determine an angle between the upper and lower arms 115, 120 as well as the relative motion of the various portions of the exoskeleton system 100 such as the upper and lower arms 115, 120. In one example, a determination can be made that, while the angle deviation of the joint 125 is at an acceptable level and the upper arm 115 of the actuation unit 110 does not move significantly under power, the lower arm 120 is experiencing significant motion caused by improper fit of lower leg straps 150C, 150D.

In yet another embodiment, the exoskeleton system 100 can apply a slowly increasing torque to a joint 125 of an actuation unit 110. In one example, sensor data can indicate a moderate amount of motion near the beginning of force application but that the deviation of lower leg orientation remains constant at higher torque. The exoskeleton system 100 may then interpret its motion relative to the user insufficient to trigger the safety threshold, and as a result, not stop operation of the device. However, the exoskeleton system 100 can infer sub-optimal coupling between the exoskeleton system 100 and the user 101 (e.g., inadequate tightness of one or more couplers 150) and intelligently account for "slop" or displacement between the exoskeleton system 100 and the user 101. As discussed herein, the exoskeleton system 100 can indicate to the user 101 to tighten straps of couplers 150 on a specific portion of concern.

Further embodiments can assess and provide an indication associated with various other suitable aspects of fit between an exoskeleton system 100 and user 101, which include but are not limited to: specific joint angle deviations; device segment angle deviations; angle deviations that are functions of variable forces applied; angle deviations that are functions of variable frequencies applied; specific straps are not connected; specific straps require tightening; or the device requires a hardware service to fit properly.

Further embodiments can use other suitable sensor data or calculated information to determine an improper fit of the actuator unit 110 to the user 101. For example, in one embodiment, sensors can be used to determine contact or lack of contact between the user 101 and one or more portions of the actuator unit 110. In another embodiment, sensors can be used to determine tension of straps of couplers 150. In a further embodiment, sensors can identify lateral displacement of portions of an actuator unit 110 (e.g., upper arm 115, lower arm 120, joint 125, and the like).

Determining improper fit of the actuator unit 110 to the user 101 can have various suitable levels of specificity. For example, in some embodiments, such a determination can be at the actuator unit 110 level. In other words, a determination can be made of improper fit of the actuator unit 110 to the user 101 without further specificity. In another embodiment, an improper fit determination can be at a component-level. For example, a determination can be made that the upper arm 115 and/or lower arm 120 of an actuator unit 110 are improperly fit without further specificity. In a further embodiment, an improper fit determination can be at a coupler-level. For example, a determination can be made that one or more couplers (e.g., a first, second, third or fourth coupler 150A, 150B, 150C, 150D).

Such levels of determination can be used to provide instructions to a user 101 or technician for correcting the fit issue. For example, where an improper fit indication is at the actuator unit level, an improper fit indication can include an instruction to tighten loose coupler straps on a right and/or left actuator unit 110R, 110L of an exoskeleton system 100. Where an improper fit indication is at the coupler-level, an improper fit indication can include an instruction to tighten a first loose coupler strap 150A on the upper arm 115 of a first actuator unit 110 of an exoskeleton system 100.

In further embodiments, any other suitable adjustments or remedies can be recommended based on determined improper fit. For example, a user can be instructed to shorten or lengthen a portion of an upper and/or lower arm 115, 120; to increase or decrease a friction or bias associated with a joint; to replace or service a portion of an exoskeleton system 100; to switch out a modular component for a different modular component, and the like.

In various embodiments a fit test can be performed by actuating a single actuator during a given fit test session. For example, where an exoskeleton system comprises a first and second actuator unit 110R, 110L, with each actuator unit comprising a single respective bellows actuator 130 (e.g., as shown in FIG. 1) a separate fit test can be sequentially performed on each actuator unit or can be performed simultaneously on both the actuator units. Additionally, in some embodiments a given actuator unit 110 can comprise a plurality of actuators 130. In such embodiments a given fit test can be performed on the actuator unit by actuating the plurality of actuators separately and successively; by actuating the plurality of actuators simultaneously; by actuating a subset of the actuators successively; and the like.

While some embodiments include a static fit test method (e.g., as in FIG. 8) where a user 101 substantially maintains the same position during the fit test, further embodiments can include a fit test performed while a user 101 is moving. For example, FIG. 9 illustrates an example method 900 of performing a moving fit test, which in some examples can be performed by an exoskeleton device 510 of an exoskeleton system 100 (see e.g., FIG. 5).

The method 900 begins at 910 where a moving fit test is initiated, and at 920 a moving fit test movement indication is generated. For example, a moving fit test can be initiated similar to how a static fit test is initiated as discussed herein, and a fit test movement indication can be generated in a similar way as in a static fit test. However, for a moving fit test, a user 101 can be instructed to perform or prepare to perform one or more movements for the moving fit test instead of assuming a static position. Such one or more movements can include walking, running, standing from a sitting position, sitting from a standing position, squatting, bending and/or extending a single leg, and the like.

At 930, a determination can be made that the user 101 has assumed an initial fit testing dynamic stance phase, and at 940 an actuator unit configuration in the initial dynamic stance phase is determined. At 950, one or more actuator units 110 of an exoskeleton system is actuated during user movement, and at 960 a change in actuator unit configuration is determined during user movement. At 970 a determination is made whether the change in the configuration of the actuator unit 110 during actuation corresponds to an improper fit of the actuator unit 110 to the user 101. If the determined configuration change is determined to not correspond to an improper fit, then at 980 a proper fit indication is generated. However, if the determined configuration change is determined to correspond to an improper fit, then at 990 an improper fit indication is generated.

For example, while the user 101 is performing one or more movements, data from sensors (e.g., sensors 513 of an exoskeleton device 510 of an exoskeleton system 100 as shown in FIG. 5) can be used to determine whether improper fit of the exoskeleton system 100 to the user 101 is present. In some examples, data obtained during the moving fit test can be compared to data sampled during user movement with ideal fit conditions and/or incorrect fit conditions. For example, one or more sets of comparison data can be generated by having one or more test users move in an exoskeleton system 100 while the exoskeleton system 100 is coupled to the test user with proper fitting and/or improper fitting of various specificities.

In various embodiments, data from test movement of test users can be used to generate a data profile for movement with proper fit of the exoskeleton system 100 of a user and/or improper fit of the exoskeleton system 100 to the user. Improper fit profiles can be generated for various improper fit conditions. One example can include a profile for improper fit of an upper arm 115 of an actuation unit 110, improper fit of a lower arm 120 of an actuation unit 110, and improper fit of both the upper and lower arms 115, 120 of an actuation unit 110. Another example can include a profile for improper fit of a first coupler 150A; improper fit of a second coupler 150B; improper fit of a third coupler 150C; improper fit of a fourth coupler 150D; improper fit of a first and fourth coupler 150A, 150D; improper fit of a second and third coupler 150B, 150C; improper fit of a first, second and fourth coupler 150A, 150B, 150D; improper fit of a first, second, third and fourth coupler 150A, 150B, 150C, 150D; and the like.

Accordingly, by comparing data from movement during a fit test to one or more data profiles for proper and/or improper fit, a determination of proper and improper fit can be made and/or a determination of specific fit issue at various levels of specificity can be identified based on matching of the moving fit test data with a given data profile for improper fit. Also, while the present example is discussed relative to a moving fit test, use of data profiles can be applied to static fit testing as discussed herein.

In further embodiments, determining proper fit or improper fit of an exoskeleton system 100 to a user 101 during a moving fit test can be done in various suitable ways. For example, the method 900 can include evaluating the fit of the exoskeleton system 100 on the user 101 in a plurality of dynamic stance phases throughout a movement of a user (e.g., a walking gait).

In one example, when the foot of the user contacts the ground, the exoskeleton system 100 can collect initial data regarding the configuration of the exoskeleton device 100 and the initial un-actuated (e.g., unpowered or un-power-assisted) motion of the exoskeleton device 100. The exoskeleton device 100 can be attached to the foot and to the lower leg 105 of the user 101 (e.g., via third and/or fourth couplers 150C, 150D, or the like). In a dynamic stance phase of walking behaviors, in various examples, the lower portion of the lower leg 105 substantially rotates around the ankle joint of the leg 102 of the user 101. Therefore, the part of the exoskeleton device 100 connected to the lower leg portion 105 should ideally rotate about the ankle joint in a similar fashion in such examples.

As part of a moving fit test, actuation can be introduced to an ankle portion of the exoskeleton system 100 after ground contact is detected to assist the walking behavior of the user 101. The exoskeleton system 100 can collect sensor data to measure the motion of the exoskeleton device 100 during this actuated configuration. A comparison can be made between the un-actuated and actuated states (e.g., between powered and unpowered states) to determine whether the exoskeleton system 100 or portions thereof are properly fit to the user 101.

In an embodiment, such a comparison can be made to evaluate if the actuation unit 110 is moving appropriately with the lower leg portion 105 in an arc about the ankle joint or if the actuation unit 110 is translating up the lower leg portion 105 of the user 101. If the device is translating up the leg 102 of the user 101 above a threshold amount, a determination (e.g., at 970) can be made that poor fit criteria has been met or that a poor fit threshold has been reached. In response to such a determination, an improper fit indication can be generated which can include a prompt to the user to tighten one or more couplers 150 associated with the lower leg 105 of the user 101. Additionally, in some embodiments, where a determination of improper fit is made, power, actuation capacity, range of motion, or other capacity of the exoskeleton system 100 can be limited for the safety of the user 101 until a subsequent fit test determines proper fit to a user 101.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method of performing a fit test on a wearable pneumatic exoskeleton system coupled to a user:
    coupling the wearable pneumatic exoskeleton system to legs of a user, the wearable pneumatic exoskeleton system comprising:
        a left and right pneumatic leg actuator unit respectively associated with a left and right leg of the user, the left and right pneumatic leg actuator units each including:
            a rotatable joint configured to be aligned with a rotational axis of a knee of the user wearing the pneumatic exoskeleton system,
            an upper arm coupled to the rotatable joint and extending along a length of an upper leg portion above the knee of the user wearing the pneumatic exoskeleton system,
            a lower arm coupled to the rotatable joint and extending along a length of a lower leg portion below the knee of the user wearing the pneumatic exoskeleton system, and
            an inflatable bellows actuator defining a bellows cavity, the inflatable bellows actuator configured to extend along a length of the bellows actuator when pneumatically inflated by introducing pneumatic fluid into the bellows cavity and configured to actuate the upper arm and lower arm;
        a pneumatic system configured to introduce pneumatic fluid to the bellows actuators of the pneumatic leg actuator units to independently actuate the bellows actuators, and
        an exoskeleton computing device including:
            a plurality of sensors,
            a memory storing at least a fit test program, and
            a processor configured to execute the fit test program to control the pneumatic system; and
    executing the fit test program by the processor to cause pneumatic exoskeleton system to:
        generate a fit testing position indication instructing the user to assume a seated position with the knees of the user in a bent position;
        determining that the user has assumed the seated position with the knees of the user in a suitable bent position;
        actuating the right pneumatic leg actuator unit with the user remaining in the seated position with the knees of the user in the suitable bent position;
        determining a first configuration of the upper arm and lower arm of the right pneumatic leg actuator unit during the actuating of the right pneumatic leg actuator unit, with the user remaining in the seated position with the knees of the user in the suitable bent position, the determining of the first configuration based at least in part on data obtained from a subset of the plurality of sensors;
        determining a second configuration of the upper arm and lower arm of the right pneumatic leg actuator unit during the actuating of the right pneumatic leg actuator unit, with the user remaining in the seated position with the knees of the user in the suitable bent position, the determining of the second configuration based at least in part on data obtained from the subset of the plurality of sensors;
        determining a change in configuration based at least in part on a difference between the first and second configuration;
        determining that the change in configuration corresponds to an improper fit of the right pneumatic leg actuator unit to the right leg of the user; and
        generating an improper fit indication that indicates improper fit of the right pneumatic leg actuator unit to the right leg of the user.

2. The method of claim 1, wherein executing the fit test program by the processor further causes pneumatic exoskeleton system to, after generating the improper fit indication that indicates improper fit of the right pneumatic leg actuator unit to the right leg of the user:
    actuating the left pneumatic leg actuator unit with the user remaining in the seated position with the knees of the user in the suitable bent position;
    determining a first configuration of the upper arm and lower arm of the left pneumatic leg actuator unit during the actuating of the left pneumatic leg actuator unit, with the user remaining in the seated position with the knees of the user in the suitable bent position, the determining of the first configuration based at least in part on data obtained from a subset of the plurality of sensors;
    determining a second configuration of the upper arm and lower arm of the left pneumatic leg actuator unit during the actuating of the left pneumatic leg actuator unit, with the user remaining in the seated position with the knees of the user in the suitable bent position, the determining of the second configuration based at least in part on data obtained from the subset of the plurality of sensors;
    determining a change in configuration based at least in part on a difference between the first and second configuration;

determining that the change in configuration corresponds to an improper fit of the left pneumatic leg actuator unit to the left leg of the user; and generating an improper fit indication that indicates improper fit of the left pneumatic leg actuator unit to the left leg of the user.

3. The method of claim 1, wherein determining the change in configuration based at least in part on the difference between the first and second configuration comprises: determining a displacement angle of one or both of the upper arm and lower arm of the right pneumatic leg actuator unit.

4. The method of claim 1, wherein the right pneumatic leg actuator upper arm and lower arm are coupled to the right leg of the user via a respective plurality of couplers of a set of couplers, with each of the couplers of the set of couplers including a strap that surrounds a portion of the right leg of the user; and wherein the improper fit indication that indicates improper fit of the right pneumatic leg actuator unit to the right leg of the user further includes an indication of one or more of the couplers of the set of couplers being improperly secured to the right leg of the user and an indication that the other couplers of the set of couplers are properly secured to the right leg of the user.

5. The method of claim 1, wherein actuating the right pneumatic leg actuator unit with the user remaining in the seated position with the knees of the user in the suitable bent position comprises: actuating with an increasing pulsing force applied by the right pneumatic leg actuator unit at a defined frequency, starting from an initial torque until a maximum torque threshold is reached; and wherein the determining the change in configuration based at least in part on the difference between the first and second configuration is based on a difference in configuration at the initial torque compared to a configuration at the maximum torque threshold; and wherein the increasing pulsing force applied by the right pneumatic leg actuator unit is applied at a fixed frequency, a variable frequency, or a random frequency.

6. The method of claim 1, wherein actuating the right pneumatic leg actuator unit with the user remaining in the seated position with the knees of the user in the suitable bent position comprises two or more cycling repetitions of:

increasing force applied by the right pneumatic leg actuator unit in a first direction until a first maximum torque threshold is reached; and increasing force applied by the right pneumatic leg actuator unit in a second direction that is opposite of the first direction until a second maximum torque threshold is reached.

7. A method of performing a fit test on a leg actuator unit coupled to a user, the method comprising:

coupling the leg actuator unit to a leg of a user, the leg actuator unit comprising:
  a joint configured to be aligned with a knee of the leg of the user wearing the leg actuator unit;
  an upper arm coupled to the joint and extending along a length of an upper leg portion above the knee of the user wearing the leg actuator unit;
  a lower arm coupled to the joint and extending along a length of a lower leg portion below the knee of the user wearing the leg actuator unit; and
  an actuator configured to actuate the upper arm and lower arm;
actuating the leg actuator unit;

determining a first configuration of the upper arm and lower arm of the leg actuator unit generated during actuating the leg actuator unit;

determining a second configuration of the upper arm and lower arm of the leg actuator unit during actuating the leg actuator unit;

determining a change in configuration based at least in part on the difference between the first and second configuration;

determining that the change in configuration corresponds to an improper fit of the leg actuator unit to the leg of the user; and generating an improper fit indication that indicates improper fit of the leg actuator unit to the leg of the user.

8. The method of claim 7, wherein the determining the change in configuration based at least in part on the difference between the first and second configuration comprises: determining a displacement angle of one or both of the upper arm and lower arm of the leg actuator unit.

9. The method of claim 7, wherein the actuating the leg actuator unit comprises: increasing force applied by the leg actuator unit, starting from a first torque and increasing to a second torque that is greater than the first torque; and wherein the determining the change in configuration based at least in part on the difference between the first and second configuration is based on a difference in configuration between respective configurations generated by the first torque and the second torque.

10. The method of claim 9, wherein the increasing force is applied as a pulsing force at a defined frequency, including one of a fixed frequency, a variable frequency, and a random frequency.

11. The method of claim 9, wherein the increasing force is applied as a constant force.

12. The method of claim 7, wherein the actuating the leg actuator unit comprises:

increasing force applied by the leg actuator unit in a first direction until a first torque threshold is reached; and increasing force applied by the leg actuator unit in a second direction that is opposite of the first direction until a second torque threshold is reached.

13. A method of performing a fit test on an actuator unit coupled to a user, the method comprising:

actuating the actuator unit;

determining a first configuration of the actuator unit generated during the actuating the actuator unit;

determining a second configuration of the actuator unit generated during the actuating the actuator unit;

determining a change in configuration of the actuator unit based at least in part on the difference between the first and second configuration; and determining that the change in configuration corresponds to an improper fit of the actuator unit to the user, wherein the actuating the actuator unit comprises changing force applied by the actuator unit, including a first torque and a second torque that is greater than the first torque; and wherein the determining the change in configuration based at least in part on the difference between the first and second configuration is based on a difference in configurations generated by the first torque and the second torque.

14. The method of claim 13, wherein the changing force applied by the actuator unit is applied as a pulsing force.

15. The method of claim 13, wherein the changing force is applied by the actuator unit is applied as a constant changing force.

16. The method of claim 13, wherein the actuating the actuator unit comprises:
   applying force by the actuator unit in a first direction; and
   applying force by the actuator unit in a second direction that is opposite of the first direction.

17. The method of claim 13, further comprising generating an improper fit indication that indicates improper fit of the actuator unit to the user including an indication of a specific portion of the actuator unit being improperly fit to the user.

18. The method of claim 13 further comprising limiting a capability of the actuator unit in response to the determining that the change in configuration corresponds to an improper fit of the actuator unit to the user.

* * * * *